United States Patent Office 3,149,908
Patented Sept. 22, 1964

3,149,908
OXYCHLORIDES OF PENTAVALENT
NEPTUNIUM
Theodore J. La Chapelle, Jr., Inglewood, Calif., assignor to the United States of America as represented by the United States Atomic Energy Commission
No Drawing. Filed Aug. 24, 1949, Ser. No. 112,173
10 Claims. (Cl. 23—14.5)

This invention relates to the production of compounds of the element neptunium. More particularly, this invention relates to the production of the pentavalent oxychlorides of neptunium.

In many technical processes, in order that particular elements may be employed as process materials therein, it is a necessary prerequisite that various chemical compounds of the element become available. In the past, experience has shown that utilization of new elements as process materials follows closely and as a direct result of the synthesis of compounds of the element.

Little is known concerning chemical compounds of the element neptunium. As is more or less generally known, neptunium, together with other transuranic elements, is virtually non-existent in nature. However, transuranic elements, particularly neptunium and plutonium, elements 93 and 94 respectively, may be produced by a nuclear transmutation of uranium by means of processes which are not a part of the present invention. One very important application of the present invention, however, is in the utilization of neptunium produced by such transmutation.

The transmutation of uranium may be effected by various processes including irradiation of uranium with neutrons from any suitable source. Different isotopes of element 93 (neptunium) may be produced by irradiation of uranium with neutrons dependent upon the type of reaction initiated thereby. For example, when a mass of uranium is subjected to neutron irradiation, particularly with neutrons of resonance or thermal energies, $_{92}U^{238}$ by capture of a neutron becomes $_{92}U^{239}$ which has a half life of twenty-three minutes and by emission of a beta particle becomes $_{93}Np^{239}$. This isotope of neptunium has a half life of 56 hours. Another isotope of neptunium may be produced by irradiation of a mass of $_{92}U^{238}$ with neutrons whereby an (n, 2n) reaction is initiated to produce $_{93}Np^{237}$ which isotope decays by alpha emission and has a half life of $2.25 \times 10^6$ years.

The neptunium produced by these reactions may be recovered by processes specifically designed for this purpose or may be recovered as a by-product of the processes employed for the recovery of plutonium. In either case, the product neptunium is obtained in the form of relatively simple compounds such as neptunium dioxide ($NpO_2$).

As a prerequisite to wide commercial application of the element neptunium there exists the necessity of producing compounds of this element which have properties which are more suitable to meet the complex demands of modern technology. The task of preparing compounds of this element has been complicated by the fact that the chemistry of neptunium is anomalous with respect to its position in the extrapolated periodic system. Normally, one would expect that the chemistry of neptunium would be that of a homologue of rhenium in accordance with generally accepted theories of extrapolated periodic system predictions. However, on the contrary, it has been discovered that the chemistry of neptunium does not resemble that of rhenium.

The desirability of providing methods for producing neptunium compounds can be seen from the foregoing discussion.

The extensive chemistry art does not in fact and could not be expected to furnish substantial help in the synthesis of neptunium compounds. This is particularly true for the compounds which are the subject of this invention. Applicant is unaware of any reference to methods of producing the oxychlorides of neptunium nor even a recorded speculation as to the preparation of the compounds.

Now, I have found that the oxychlorides of pentavalent neptunium, particularly neptunium monoxy-trichloride ($NpOCl_3$) and neptunium dioxy-monochloride ($NpO_2Cl$), may be produced, broadly speaking, by the dehydration of a solution containing chloride ions and neptunium in the pentavalent ionic state. By suitable modification of the general method the product has been made to contain predominantly either neptunium monoxy-trichloride or neptunium dioxy-monochloride. Moreover, these compounds were produced in a variety of forms including the anhydrous form and crystalline forms having water of crystallization.

It is accordingly a prime object of the invention to provide methods for producing the pentavalent oxychlorides of neptunium.

It is also an object of the invention to produce the pentavalent oxychlorides of neptunium by the dehydration of a solution of pentavalent neptunium and chloride ions.

Another important object of the invention is to predetermine the relative proportions of neptunium monoxy-trichloride and neptunium dioxy-monochloride formed in the product by varying the relative amounts of neptunium and acid in the solution which is to be dehydrated and controlling the conditions of time, temperature, and pressure of the dehydration process.

One other object of the invention is to provide the pentavalent oxychlorides of neptunium as stable compositions of matter.

The invention, both as to its position in the art and its method of operation, together with further objects and advantages thereof, will best be understood by reference to the following specification.

The process of my invention may be applied to any solution containing chloride ions, pentavalent neptunium ions, and other soluble materials which will not introduce contaminants.

My invention may be understood by reference to the following description of a process which is performed in accordance with the invention.

A solution containing pentavalent neptunium is prepared by dissolving $NpO_2$ in dilute hydrochloric acid to produce a solution containing neptunium in the tetravalent ionic state. This solution is then treated with a saturated chlorine water to oxidize the neptunium to the pentavalent state. Other methods of producing the solution will be apparent to one skilled in the art.

It is important with respect to determining the composition of the final product which is formed by dehydration to control the relative amounts of neptunium ion, chloride ion, and the acidity of the solution.

I have found that the production of neptunium dioxy-monochloride ($NpO_2Cl$) is favored when the relative amounts of chloride and pentavalent neptunium ions are present in stoichiometric ratio approaching the value, one, with a slight excess of chloride ion and when the hydrogen ion concentration is low in the solution which is subsequently dehydrated.

Similarly, the production of neptunium monoxytrichloride is favored when the chloride ion is present in large excess relative to the amount of pentavalent neptunium and when the hydrogen ion concentration is relatively high in the solution which is subsequently dehydrated to produce the final product.

Although the phenomenon which produces this result is not completely understood, it is believed to be due to the existence of an ionic equilibrium involving different species of pentavalent neptunium ions which exist at different acidities of the solution. The following equation is believed to illustrate the equilibrium which exists in the solutions:

$$NpO_2^+ + 2H^+ \leftrightarrow NpO^{+++} + H_2O$$

As is apparent from the above equation, the species of pentavalent neptunium ion which is present in aqueous solution is quite dependent upon the hydrogen ion concentration. The equilibrium may be shifted to either the right or left by supplying appropriate amounts of hydrogen ion. Coupled with the shift in equilibrium, one may influence the character of the product by adjusting the chloride ion concentration to supply the proper amounts of chloride ion necessary to yield the desired product.

Once the solution is prepared, I then dehydrate the solution to yield the final product. I have found that the conditions of dehydration are also critical with respect to determining the composition of the product.

A mild dehydration as by vacuum drying at room temperature produces a crystalline form having a maximum amount of water of crystallization and lesser amounts of chlorine while a vigorous dehydration as by extended periods of heating at elevated temperatures under a high vacuum produces an anhydrous form which is extremely hygroscopic and has a higher content of chlorine. The upper limit to which the materials may be heated is limited by decomposition of the product. The rate of decomposition is rapid at 400° C. under highly evacuated conditions and is also rapid in the presence of a chlorine atmosphere at temperatures of about 500° C. The chlorine content of the material being dehydrated may be stabilized by contact with an atmosphere of chlorine or of carbon tetrachloride and the character of the product may be determined to a certain extent thereby. The use of such an atmosphere will be found efficacious when temperatures above about 120° C. are employed and particularly when it is desired to prepare products having relatively higher chlorine contents. Of course, this same principle may be appropriately employed at any time it is necessary to heat the oxychloride compounds.

An apparatus suitable for performing the dehydration operations of the invention comprises a glass reaction chamber equipped with means for controlling the temperature of said chamber and also equipped with means for evacuating said chamber to varying degrees including a relatively high degree.

In performing the dehydration process, I place a portion of the solution containing pentavalent neptunium ions together with chloride ions prepared as indicated above in the glass reaction chamber. I then apply vacuum while controlling the temperature to yield the product of the desired character.

The invention may be more readily understood with reference to the following more specific examples:

A stock solution was prepared by dissolving 8.5 mg of neptunium as $NpO_2$ in 500 microliters of 0.9 M HCl, and this solution was mixed with 2.5 ml. of water. Then, 400 microliters of saturated chlorine water was added to this solution to oxidize the neptunium to the pentavalent state. The resulting solution had the composition: 0.17 M HCl, 0.0067 M $Cl_2$, and 0.0150 M Np. This solution was used with appropriate modification in the examples which follow:

*Example 1*

A 3 microliter portion of the above-described stock solution was mixed with 50 microliters of 0.2 M HCl and the mixture was evaporated to dryness by applying a vacuum for twenty minutes. The product was analyzed as will be described below. A Cl/Np ratio of 1.39 was found in the product.

*Example 2*

A 3 microliter portion of the stock solution was evaporated by applying vacuum for ten minutes. The product was treated further by evacuating to 0.1 mm. Hg and heating to 200° C. for thirty minutes, cooling to 150° C. in fifteen minutes, then reducing the pressure to $1 \times 10^{-4}$ mm.; and while maintaining the pressure at this value, the temperature was lowered from 150° C. to 100° C. in fifteen minutes. The product was removed after cooling and was stored under dry conditions. The product was analyzed as described below. A Cl/Np ratio of 2.36 was found in the product.

The products were analyzed by various methods in order to establish the identity of the compounds.

The chlorine content of the products was quantitatively determined by dissolving a portion of the product and titrating the resulting solution with a standard solution of silver nitrate using a potentiometric method to determine the end point.

The neptunium content was assayed by preparing an infinitely thin specimen of a portion of the product and using a Geiger counter to determine the alpha activity of the sample wherefrom the amount of neptunium present was calculated. This method of analysis is a standard technique widely employed in tracer and radio-chemistry.

Spectrophotometric examination of solutions was employed to determine the valency of the neptunium in the product. Solutions were prepared and subjected to analysis in a commercially available spectrophotometer. In this manner it was determined that the neptunium present in the products was substantially all in the pentavalent state.

Microscopic examination revealed the presence of two distinct crystalline forms in the products of these reactions. The product was a yellow-green or green color.

By means of the process illustrated by the above examples, products have been produced having compositions ranging from substantially neptunium monoxy-trichloride to substantially neptunium dioxy-monochloride.

Generally speaking, it is contemplated that neptunium oxychlorides of these types may be suitably employed in the production of other halogenated compounds of neptunium. Moreover, these oxychlorides are especially suitable for the preparation of various stable aqueous solutions containing neptunium as a pentavalent ion.

While the process described may be employed with any of the isotopes of neptunium, it may be desirable when considering the final use to which the radioactive properties of this element may be put, to employ a particular isotope where a relatively high rate of decay coupled with the production of beta emission is desired, it will be found appropriate to employ compounds formed of $_{93}Np^{239}$. On the other hand, if a slow rate of decay coupled with alpha emission is desired, then one may appropriately employ the isotope $_{93}Np^{237}$ when forming the compounds.

The present process may also be appropriately applied to the synthesis of various halide derivatives of pentavalent neptunium.

While it may be considered that the embodiments as disclosed are of a preferred nature, various changes and modifications may be made without departing from the invention, and it is intended to cover all such that come within the true spirit and scope of the appended claims.

What is claimed is:

1. A process for the preparation of pentavalent oxychlorides of neptunium comprising oxidizing tetravalent neptunium ions contained in an acidic aqueous solution with chloride ions to the pentavalent state, dehydrating said solution by the application of heat while in a vacuum to produce pentavalent oxychlorides of neptunium and recovering said pentavalent neptunium oxychlorides.

2. A process for the preparation of pentavalent oxychlorides of neptunium comprising dissolving $NpO_2$ in dilute hydrochloric acid to form a solution of neptunium ions, oxidizing said solution to yield pentavalent neptunium ions, dehydrating said oxidized solution by the application of heat thereto while in a vacuum to produce pentavalent oxychlorides of neptunium and recovering said pentavalent neptunium oxychlorides as solid material.

3. The process as in claim 2 wherein chlorine water is used as the oxidizing agent.

4. A process for the preparation of neptunium monoxy-trichloride comprising treating a solution containing pentavalent neptunium ions with a stoichiometric excess of chloride ions, dehydrating said solution by heating to an elevated temperature below about 400° C. and with the application of a vacuum to produce said neptunium monoxy-trichloride and recovering said neptunium monoxy-trichloride as a solid material.

5. The process of claim 4 wherein the solution which is treated is acidic.

6. A process for the preparation of neptunium dioxy-monochloride comprising treating a solution containing pentavalent neptunium ions with chloride ions in approximate stoichiometric equivalency, dehydrating said solution under conditions of vacuum and at room temperature and recovering solid neptunium dioxy-monochloride from the dehydrated solution.

7. The process of claim 6, wherein the solution which is treated is acidic.

8. Neptunium monoxy-trichloride, a yellow-green pentavalent compound of neptunium containing neptunium, oxygen, and chlorine in the atomic proportions, 1:1:3.

9. A process for the preparation of pentavalent oxy-chlorides of neptunium comprising dissolving $NpO_2$ in a hydrochloric acid solution to form a reaction mixture, oxidizing the neptunium in said reaction mixture to the pentavalent state by the addition of chlorine water, heating said reaction mixture and the pentavalent neptunium therein to approximately 200° C. for about thirty minutes while maintaining an atmospheric pressure of about 0.1 mm. Hg, cooling said treated mixture to about 150° C. over a period of about 15 minutes, reducing the atmospheric pressure over said mixture to about $1 \times 10^{-4}$ mm. Hg while further lowering the temperature of said mixture to about 100° C. in about 15 minutes thereby dehydrating said reaction mixture and forming a solid pentavalent neptunium oxychloride product, and recovering the pentavalent neptunium oxychloride.

10. In a process of producing the pentavalent oxychlorides of neptunium by the dehydration of an aqueous solution containing pentavalent neptunium ions and chloride ions with heating in the range of about 120° to 500° C. the step comprising maintaining an atmosphere composed of a material selected from the group consisting of chlorine and carbon tetrachloride in contact therewith during said dehydration thereby stabilizing the chlorine content of the pentavalent neptunium oxychloride product.

References Cited in the file of this patent

Ephraim: Zeitschrift für Anorganische Chemie, vol. 35, pp. 66–70 (1903).

Levy: Chemistry of the Rare Earths, page 122 (1915), published by Longmans, Green and Co., New York.

Mellor: Comprehensive Treatise of Inorganic and Theoretical Chemistry, vol. XII, pp. 85 and 86 (1932), published by Longmans, Green and Co., N.Y. and London.

MacMillan et al.: Physical Review, volume 57, pages 1185 and 1186 (1940).

Seaborg: Chemical and Engineering News, volume 23, No. 23, page 2190–2193 (1945).

Kraus et al.: The Hydrolytic Behavior of Uranium and the Transuranic Elements, AECD 1864, page 9, declassified March 8, 1948, Technical Information Division, Oak Ridge, Tenn.